May 27, 1958 G. M. RAPATA 2,836,215
PLASTIC NUT-LIKE FASTENER WITH RESILIENT WINGS
Filed Aug. 11, 1954 2 Sheets-Sheet 1
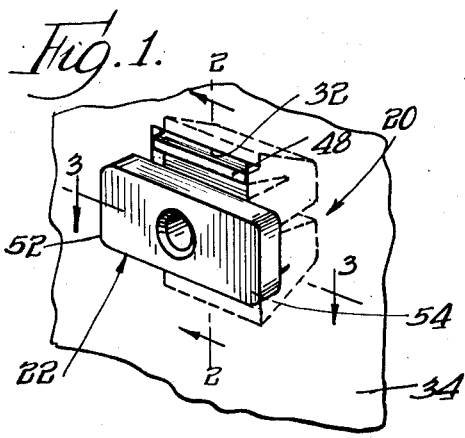
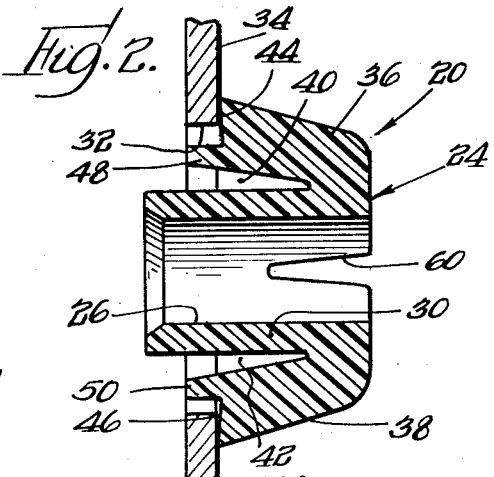
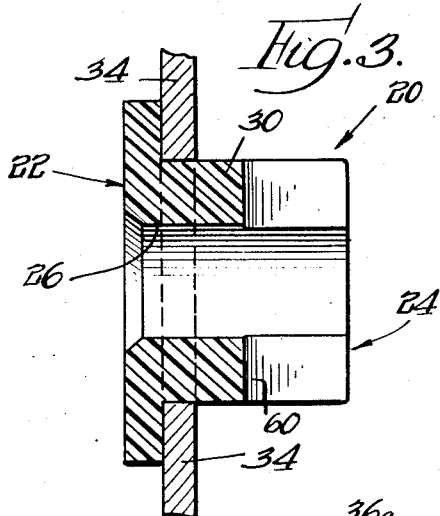
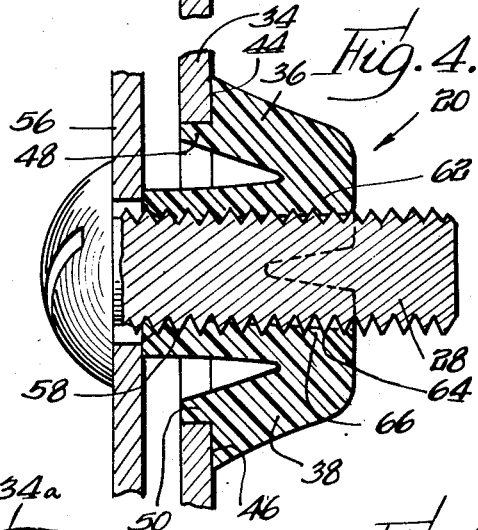
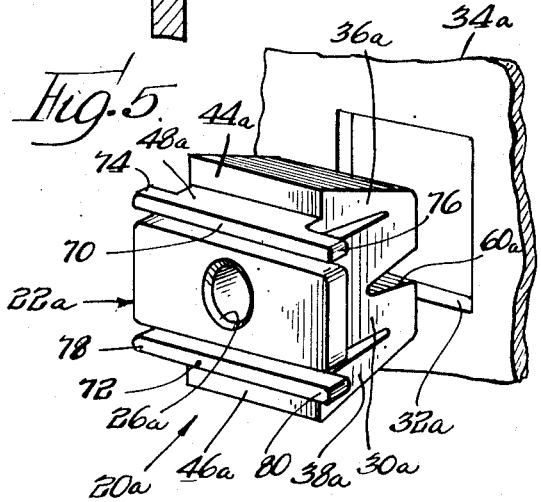
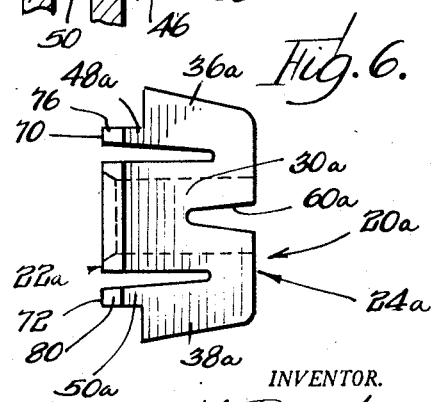
INVENTOR.
George M. Rapata
BY
Olson & Trexler
Attys.

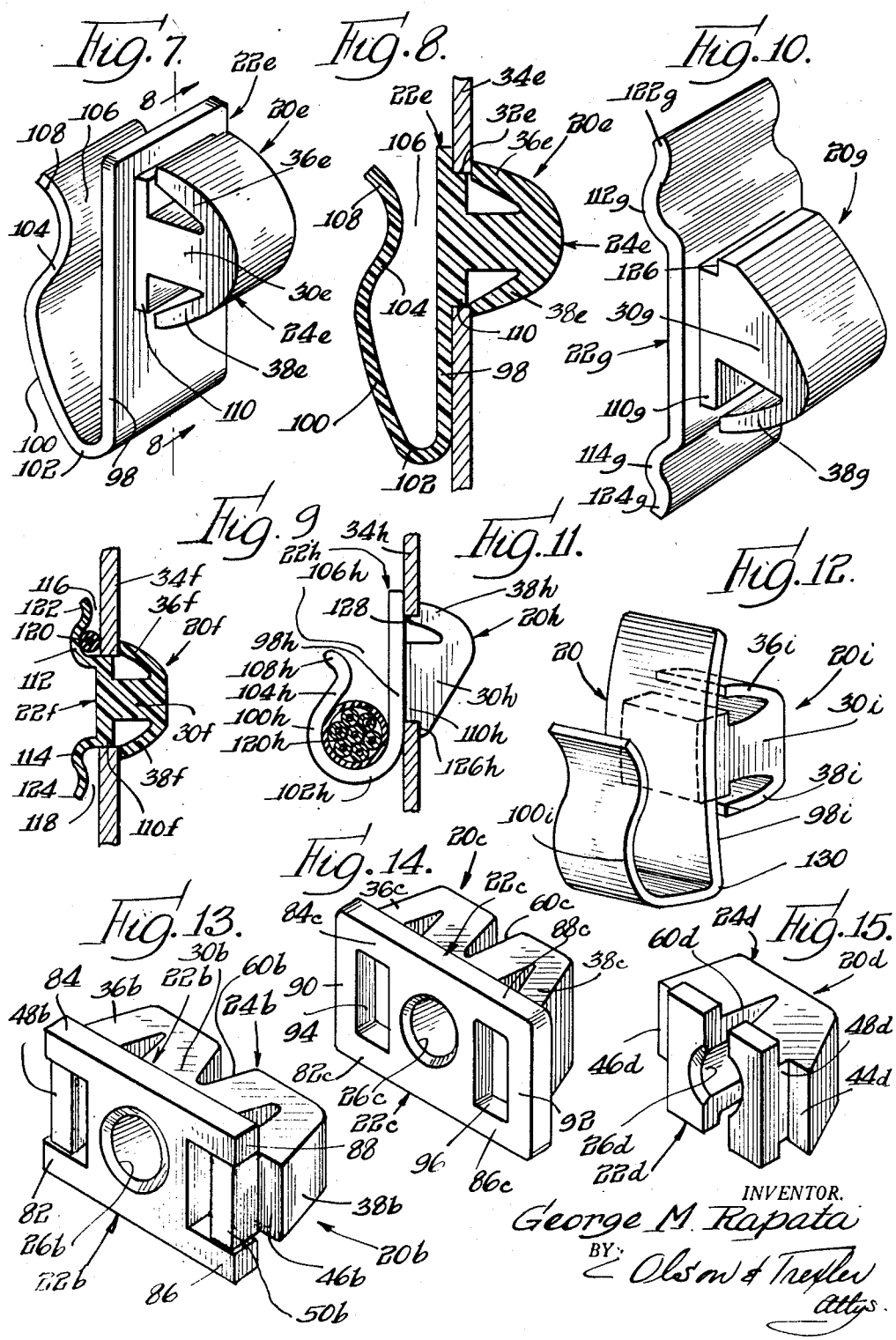

United States Patent Office 2,836,215
Patented May 27, 1958

2,836,215

PLASTIC NUT-LIKE FASTENER WITH RESILIENT WINGS

George M. Rapata, Chicago, Ill., assignor to Illinois Tool Works, Chicago, Ill., a corporation of Illinois Application August 11, 1954, Serial No. 449,092

3 Claims. (Cl. 151—41.75)

The present invention relates to novel fasteners and more particularly, to novel fasteners or anchor members for use in securing a workpiece to an apertured panel.

The present invention contemplates a novel one piece plastic fastener or anchor member which is preferably made by a moulding process. Such heretofore known plastic fasteners have usually been adapted for use only with panels having apertures therein of a specific size and, in addition, such heretofore known fasteners have often required rather complicated moulds or dies so that manufacturing costs are unnecessarily high.

An important object of the present invention is to provide a novel one piece plastic fastener member which is adapted to be assembled through apertures of various sizes in panel members and to be securely retained in assembled relationship with such panel members.

Another object of the present invention is to provide a novel fastener member of the type set forth in the preceding paragraph, which novel fastener member is formed so as to prevent lateral shifting within larger apertures or openings through which it may be assembled.

Another important object of the present invention is to provide a novel one piece plastic fastener member which may be economically manufactured by utilizing relatively simple split die means.

Still another object of the present invention is to provide a novel one piece plastic fastener member of the above described type which is adapted to receive and lock a complementary fastener member such as a screw.

A further object of the present invention is to provide a novel one piece plastic fastener member which is adapted to clamp or retain various workpieces such as a moulding strip or an electric cable in assembled relationship with an apertured panel.

Other objects and advantages of the present invention will become apparent from the following description and the accompanying drawings wherein:

Fig. 1 is a perspective view showing a novel fastener member of this invention disposed in assembled relationship with an apertured panel;

Fig. 2 is an enlarged cross sectional view taken along line 2—2 in Fig. 1;

Fig. 3 is an enlarged cross sectional view taken along line 3—3 in Fig. 1;

Fig. 4 is a cross sectional view similar to Fig. 2 and further showing a workpiece and a complementary screw member assembled with the fastener member;

Fig. 5 is a perspective view showing a novel fastener member embodying a slightly modified form of this invention in position to be assembled in an apertured panel;

Fig. 6 is a side elevational view of the fastener member shown in Fig. 5;

Fig. 7 is a perspective view showing another modified form of the present invention;

Fig. 8 is a cross sectional view taken along line 8—8 in Fig. 7 and further showing the fastener member assembled with an apertured panel;

Fig. 9 is a cross sectional view showing a fastener member embodying another modified form of the present invention assembled with an apertured panel and clamping a workpiece such as an electric cable to the panel;

Fig. 10 is a perspective view of a further modified form of the present invention;

Fig. 11 is a cross sectional view showing another modified form of a novel fastener member adapted to clamp or retain a cable;

Fig. 12 is a perspective view of a fastener member similar to the fastener member shown in Fig. 7 and incorporating a further modification;

Fig. 13 is a perspective view of a novel fastener member similar to the fastener member shown in Fig. 1 and including a modified head structure;

Fig. 14 shows a novel fastener member similar to the fastener member shown in Fig. 13 but incorporating a further slightly modified head structure; and Fig. 15 is a perspective view showing a fastener member embodying another modified form of the present invention.

Referring now more specifically to the drawings wherein like parts are designated by the same numerals throughout the various figures, a fastener member 20 embodying one form of the present invention is shown in Figs. 1 through 4. The fastener member 20 as well as the other embodiments of this invention to be described below, is made of a suitable plastic material which may be flexed or deformed and which is capable of resiliently returning to its original condition before such flexing. The fastener member 20 is formed in one piece and includes a head portion 22 and a shank portion 24 with a smooth walled bore 26 extending through these portions for receiving a complementary fastener such as a screw 28.

The shank 24 includes a central portion 30 extending axially from the head 22 for insertion through an aperture or opening 32 in a panel 34. Adjacent the free or entering end of the shank oppositely disposed flexible wing members 36 and 38 are integrally joined to opposite sides of the central shank portion 30. The wing members 38 and 36 extend back toward the head end of the fastener member and are flared outwardly so as to provide spaces or slots 40 and 42, respectively, between the wing members 36 and 38 and the central shank portion 30. The wing member 36 is provided with a shoulder 44 adjacent its free end for engaging the back surface of the panel and the wing member 38 is provided with a similar shoulder 46. As will be understood, these shoulders cooperate with head portion 22 for clamping the apertured panel and retaining the fastener member in assembled relationship with the panel.

Preferably, the shoulders 44 and 46 are inclined slightly at an angle to the axis of the fastener member and extend upwardly and outwardly as shown in Fig. 2 so that when the shoulders are drawn tightly against the panel by the screw member as shown in Fig. 4, the wing members are flared outwardly. As a result, the inherent resiliency of the wing members urges them inwardly or back to their original positions so that the wing members acting against the panel are resiliently maintained under compression and, in turn, tend to maintain the central shank portion 30 under tension for increasing the frictional engagement of the central shank portion with the complementary screw member and thereby restraining an inadvertent retrograde of the screw member. In order to prevent the wing members from spreading unduly when the screw member is applied to the fastener and to prevent lateral shifting of the fastener within the panel opening, the wing member 36 is provided with a flange or abutment portion 48 and wing member 38 is provided with a similar flange or abutment portion 50. As shown best in Figs. 2 and 4, the flanges 48 and 50 are adapted to extend into the opening to thereby position the fastener member within the opening and to restrain undue lateral flexing of the wing members.

As shown best in Fig. 1, the head portion 22 of the fastener is elongated and positioned so that the fastener, as a whole, when viewed from the end, appears to have a cruciform shape. More specifically, elongated end portions 52 and 54 of the head project laterally outwardly from opposite sides of the shank and in a direction extending transversely of a plane bisecting both wing members, and the narrow width of the head is substantially co-extensive with the central shank portion 30. This arrangement greatly facilitates economical manufacturing of the fastener members since a simple two piece split die may be used, which die is formed so that one portion thereof shapes the head 22, the slots 40 and 42, the shoulders 44 and 46 and flanges 48 and 50 and the other portion thereof shapes the remainder of the shank and wing members. Furthermore, by forming the head portion 22 in the shape of an elongated narrow rectangle, substantial stock material may be saved as compared to a somewhat similar fastener member having a square head.

The fastener member 20 may be utilized in a variety of installations which include an apertured panel such as the panel 34. While the aperture 32 in the panel may have various shapes, it is preferably made in the form of an elongated rectangle having a width similar to the width of the central shank portion 30 and less than the length of the head 22, and a length approximating the distance between the panel engaging faces of the flanges 48 and 50. The fastener member may be readily assembled with such an apertured panel merely by inserting the shank through the aperture during which insertion, the wing members flex inwardly until the shoulders 44 and 46 pass beneath the panel whereupon the wing members flex outwardly to the position shown in Fig. 2. Then any desired apertured workpiece such as the workpiece 56 may be mounted to the panel 34 by utilizing the fastener member and the screw 28 as shown in Fig. 4. It is to be noted that the smooth walled bore 26 has a diameter which is preferably substantially equal to the inner diameter of the screw threads so that during application of the screw, the threads of the screw cut and form complementary helical threads 58 in the wall of the bore as shown in Fig. 4. It should be noted that the entering end of the shank is provided with an axially extending slot, 60, which slot preferably terminates well short of the head and also short of the shoulders on the wing members. The slot 60 divides the entering end of the shank so that entering end sections 62 and 64 may be expanded or flexed outwardly during the application of the screw member 28. It will be appreciated that when the entering end sections 62 and 64 are expanded, the wing members 36 and 38 will also be spread apart so that the fastener member is adapted to be used in panel openings having various lengths. In addition, the relatively flexible entering end sections 62 and 64 of the shank spread apart during application of the screw member so that only partial depth thread segments 66 are formed therein and the inherent resiliency of the plastic material continuously biases the end sections 62 and 64 and their thread segments into gripping engagement with the screw member to further restrain or lock the screw member against inadvertent retrograde movement. Since the slot 60 is confined to the entering end portion of the shank, the remaining portion of the shank is relatively rigid so that the threads 58 formed therein by the screw member are substantially full depth threads for maximum strength.

In Figs. 5 and 6, there is shown a slightly modified fastener member 20a which is essentially identical to the above described fastener member as indicated by the application of the same reference numerals with the suffix "a" added to corresponding elements. This embodiment differs in that it is provided with auxiliary head sections 70 and 72 on the free ends of the flanges or abutment sections 48a and 50a. The auxiliary head sections respectively include finger-like portions 74—76 and 78—80 which extend laterally outwardly from opposite sides of the flange portions 48a and 50a. The finger portions of the auxiliary head sections serve to engage the outer surface of the apertured panel 34a and thus, positively prevent the flange or abutment portions of the wing members from accidentally passing entirely through the aperture in the panel.

Fig. 13 shows another embodiment of the present invention which is similar to the fastener member 20 described above as indicated by identical reference numerals with the suffix "b" added to corresponding elements. This embodiment differs in that it is provided with a modified head portion 22a which includes finger portions 82, 84, 86 and 88 extending laterally from the longer sides of the head. These finger portions like the finger portions of the embodiment shown in Figs. 5 and 6 serves to limit tilting of the fastener member during application thereof to an apertured panel whereby the flange or abutment portions of the wing members are positively prevented from completely passing through the panel. It should be noted that by providing the head portion 22b with the finger elements in the manner shown rather than merely providing an enlarged solid head, substantial savings in stock material are obtained and simplified split dies, not shown, may be used for forming the fastener member.

Fig. 14 shows an embodiment of the present invention which is similar to the fastener member of Fig. 13 as indicated by the application of identical reference numerals with the suffix "c" added to corresponding elements. This embodiment differs in that the finger portions 82c and 84c are joined by an integral transverse member 90 and the finger portions 86c and 88c are joined by similar transverse member 92. The transverse members 90 and 92 give the head portion of the fastener member additional strength for applications in which such additional strength is needed. However, it should be noted that the finger portions and transverse members are formed so as to provide the head portion with openings 94 and 96, which openings like the spaces between the finger portions of the embodiments shown in Fig. 13 are substantially co-extensive or slightly larger than the ends of the wing members so as to permit the use of relatively simple split die means, not shown, for forming the fastener and also for effecting a substantial savings in stock material.

Fig. 15 shows another embodiment of the present invention which is somewhat similar to the above described embodiments as indicated by the application of identical reference numerals with the suffix "d" added to corresponding elements. This embodiment differs substantially in that the slot 60d extends through the head portion 22d and into the shank rather than being located at the entering end of the shank. Since the slot 60d is located in the manner just described, the separate wing members of the shank may be omitted for some applications and the shoulders 44d and 46d and the abutment portions of which only 48d is shown are formed directly on the central portion of the shank. It should be noted that the shoulder portions 44d and 46d extend laterally outwardly from the longer sides of the head portion 22d so that the fastener member 20d has a cruciform shape when viewed from the end thereof.

Figs. 7 and 8 show another embodiment of the present invention which may be utilized for clamping or retaining workpieces such as cables and the like and mounting such workpieces to an apertured panel. As indicated by the application of identical reference numerals with the suffix "e" added to corresponding elements, this embodiment is similar in many respects to the above described embodiments. More specifically, the fastener member 20e includes a head portion 22e and an axially extending shank portion 24e. The shank includes a central portion 30e and wing members 36e and 38e flaring outwardly from opposite sides thereof and extending generally toward the head section for engaging the back side of a panel 34e having an aperture 32e therein through which the shank may be inserted. As will be understood, the flexible wing members 36e and 38e will be flexed inwardly during insertion of the shank through the aperture and will then spring outwardly to the position shown in Fig. 8 for engaging the back surface of the panel.

The head portion 22e includes a relatively broad base 98 and an overlying clamping section joined to the base by a reversely bent section 102 so that the head is generally U-shaped in cross section and is adapted to receive and retain various workpieces. Preferably, the clamping section 100 is formed inwardly toward the base as at 104 to provide a restricted mouth or opening 106 through which a workpiece may be snapped. The free end of the clamping section 100 is preferably flared outwardly as at 108 to facilitate assembly of the workpiece between the clamping section and the base.

The head portion 22e also includes an axially extending abutment portion 110 which is adapted to project into the panel aperture. The periphery of the abutment portion 110 preferably is substantially identical in size and shape to the size and shape of the panel aperture so that the abutment portion serves to locate the fastener within the aperture and also serves to absorb any shear stresses applied to the fastener.

In Fig. 9 there is shown a fastener member 20f which is similar to the embodiment of Figs. 7 and 8 as indicated by the application of identical reference numerals with the suffix "f" added to corresponding elements except that the head portion 22f is modified. More specifically, the head portion 22f is provided with a pair of flexible clamping sections 112 and 114 which extend in opposite directions and are adapted to overlie the apertured panel 34f. Both of these clamping sections are formed so that they initially extend outwardly from the central head portion and then inwardly so that when the fastener member is applied to the panel, the clamping sections respectively provide restricted openings 116 and 118 in cooperation with the panel, through which openings workpieces such as an electric cable 120 may be snapped. In order to facilitate outward flexing of the clamping sections 112 and 114 during assembly therewith of a workpiece, the free ends of these sections are respectively flared outwardly as at 122 and 124. It will be appreciated that the clamping sections of the fastener member 20f might also be used for securing other workpieces than cables such, for example, as molding strips, not shown, to the apertured panel.

Fig. 10 shows a fastener member 20g which is a modified form of the above described fastener member 20f as indicated by the application of identical reference numerals with the suffix "g" added to corresponding elements. This embodiment differs in that one of the flexible wing members of the shank has been eliminated by making it solid with the central shank portion and a shoulder 126 has been provided in the now solid shank portion to take the place of the end of the omitted flexible wing member. For some installations this modification simplifies assembly of the fastener member with the apertured panel since the shoulder 126 may first be hooked beneath the panel and then the assembly may be completed merely by pressing inwardly on the fastener until the wing member 38g snaps beneath the panel. The fact that there is only one resilient wing member assures proper alignment of the shank and the abutment portion 110g with the aperture of the panel at all times since the fastener is positively located within the aperture by the surface of the abutment means adjacent the shoulder 126.

Fig. 11 shows a fastener member 20h which incorporates modifications of the structures shown in Figs. 7, 8 and 10 as indicated by the application of identical reference numerals with the suffix "h" added to corresponding elements. In this embodiment the means 110 or 110g of the above described embodiments has been omitted and has been replaced by a flange or abutment portion 128 on the flexible wing member 38h, which flange or abutment portion 128 is adapted to engage a side of the panel aperture in the same manner as the similar flanges of the embodiments shown in Figs. 1 through 4 and described above. Thus, the fastener 20h may be especially useful when it is to be applied to apertures of varying sizes. As will be seen by referring to the drawings, the clamping section 100h is generally similar to the above described clamping section 100 except that the shape of the section 100 h has been slightly modified to adapt it, especially for receiving a relatively large electric cable 120h.

Fig. 12 discloses still another modified form of the present invention which is essentially identical to the embodiment shown in Figs. 7 and 8 as indicated by the application of identical reference numerals with the suffix "i" added to corresponding elements. The embodiment of Fig. 12 differs only in that the clamping section 100i is joined to the base 98i of the head portion along a relatively sharp corner section 130 and in that the base 98i is curved so that the concave side thereof faces the shank portion. The relatively sharp corner section 130 serves to stiffen the clamping section 100i for more aggressive and more positive engagement of the workpiece held thereby and the curved formation of the base 98i serves to insure that the ends of the flexible wing members 36i and 38i will always be resiliently urged into engagement with the apertured panel regardless of any slight variations in the thickness of the panel to which the fastener is applied.

From the above description it is seen that the present invention has provided a novel one piece plastic fastener or anchor member which fully satisfies the objects heretofore set forth. More specifically, it is seen that the present invention has provided a novel one piece plastic fastener member which may be easily snapped into assembled relationship with an apertured panel and which is adapted to be assembled with panels having various thicknesses and having apertures of various dimensions. It is also seen that the present invention has provided fastener members of relatively simple construction so that they may be economically made with simple split die means and without requiring an undue amount of stock material.

While the preferred embodiments of the present invention have been shown and described herein, it is obvious that many structural details may be changed without departing from the spirit and scope of the appended claims.

The invention is claimed as follows:

1. A one-piece plastic fastener for application to an apertured workpiece comprising an apertured head, and a shank portion depending therefrom and of polygonal shape and having an aperture forming a continuation of the head aperture for accommodating a complementary screw member, said head having portions projecting laterally outwardly of said shank portion for overlying and engaging one side of the workpiece, a pair of resilient wings joined to the terminal end of said shank portion away from said head on opposite sides thereof and extending toward said head, the said opposite sides of said shank portion presenting continuous uninterrupted wall surfaces for the aperture beneath said wings and said wings being substantially coextensive in width with said opposite sides of the shank portion, said wings extending in laterally spaced relationship from said opposite sides of the shank portion to permit lateral flexing of the wings relative to said sides and into embracing position relative to said shank portion as an incident to insertion of the fastener into a complementary workpiece aperture, each of said wings having at its free end an outwardly extending shoulder adapted for engagement with the surface of the workpiece remote from said head and an abutment portion at the inner edge of the adjacent shoulder and extending toward said head for projecting between the shank portion and a wall of the workpiece aperture and for engagement with the wall of the workpiece aperture to restrain lateral shifting of the wings as the complementary screw member is mounted in the screw accommodating aperture, each said abutment portion being spaced laterally from said shank portion sufficiently to enable the wings to be flexed laterally inwardly during insertion of the fastener into a complementary workpiece aperture.

2. A one-piece plastic fastener as claimed in claim 1, wherein each said shoulder is inclined outwardly and toward said head for flaring the wings outwardly as the shoulders are drawn tightly against the workpiece.

3. A one-piece plastic fastener as claimed in claim 1, wherein each wing includes an auxiliary head section adjacent the fastener head and provided with laterally projecting fingers adapted to engage the outer surface of the workpiece to position the abutment portions within the aperture therethrough.

References Cited in the file of this patent

UNITED STATES PATENTS

| | | |
|---|---|---|
| 2,104,217 | Barnes | Jan. 4, 1938 |
| 2,126,482 | Lombard | Aug. 9, 1938 |
| 2,279,903 | Johnson | Apr. 14, 1942 |
| 2,424,757 | Klumpp | July 29, 1947 |
| 2,476,436 | Trafton | July 19, 1949 |
| 2,545,514 | Erb | Mar. 20, 1951 |
| 2,596,940 | Poupitch | May 13, 1952 |
| 2,733,067 | Moore et al. | Jan. 31, 1956 |
| 2,788,047 | Rapata | Apr. 9, 1957 |

FOREIGN PATENTS

| | | |
|---|---|---|
| 707,819 | Great Britain | Apr. 21, 1951 |